United States Patent Office 3,477,313
Patented Nov. 11, 1969

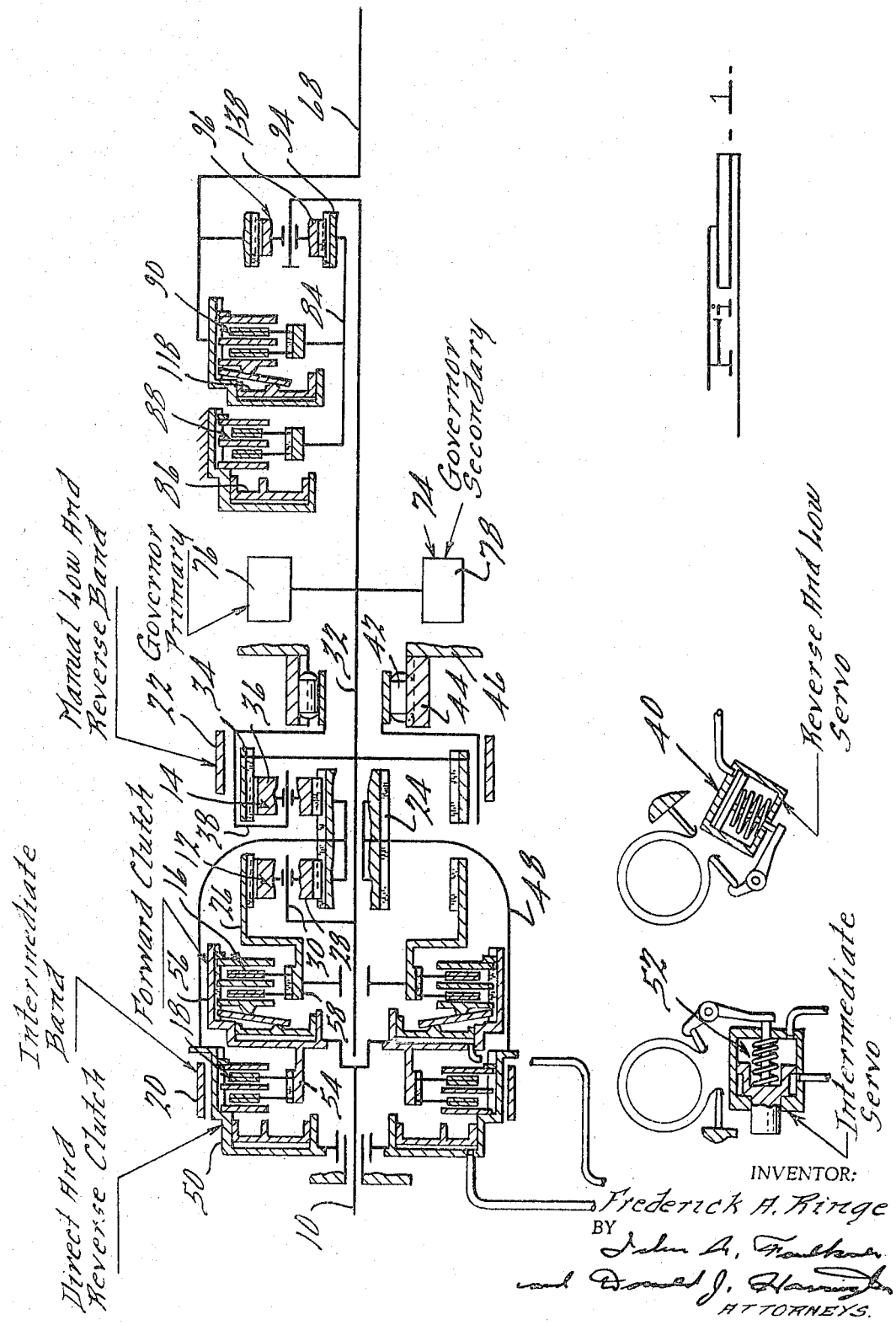

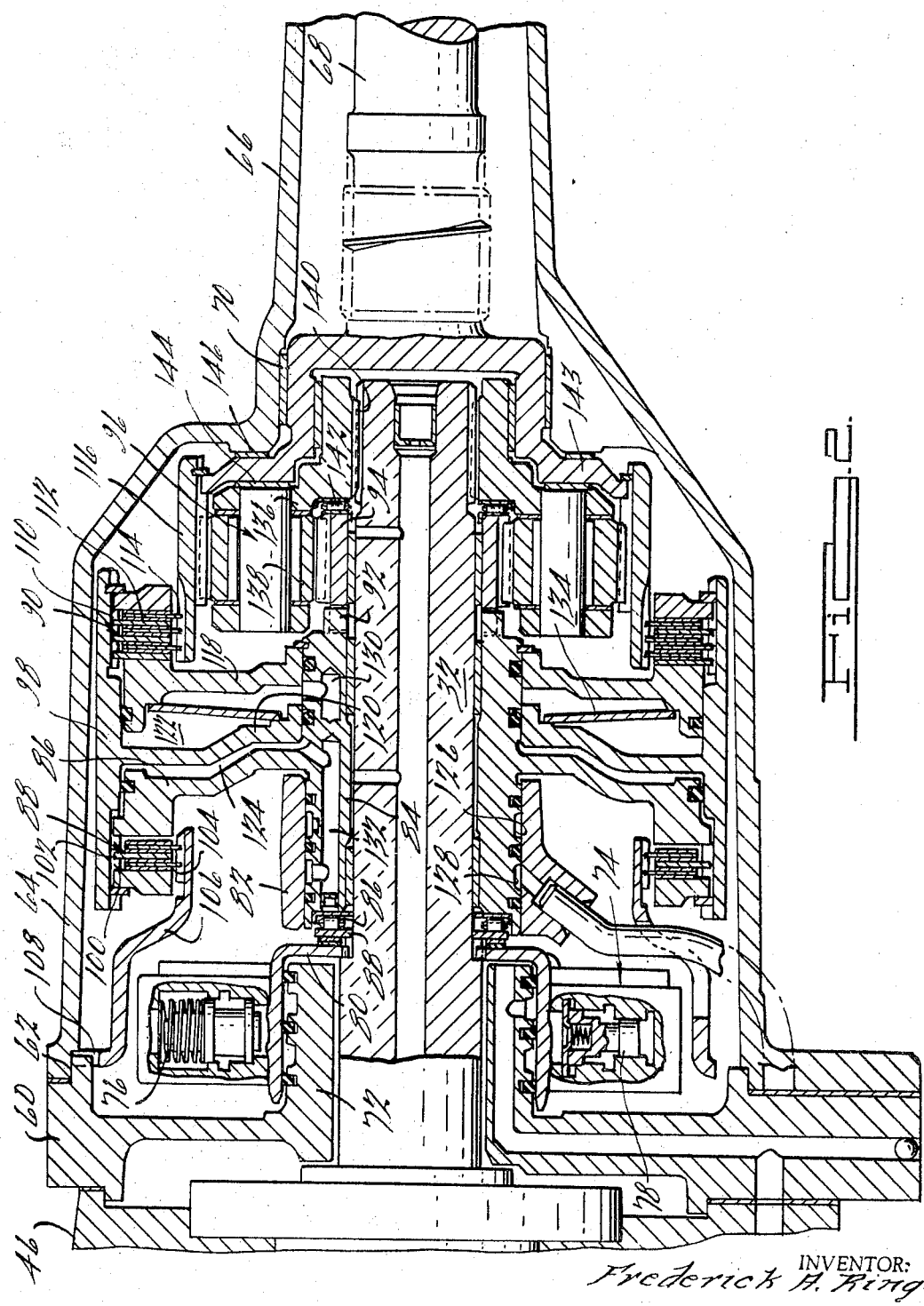

3,477,313
AUXILIARY OVERDRIVE GEAR UNIT FOR USE WITH AN AUTOMOTIVE VEHICLE POWER TRANSMISSION MECHANISM
Frederick A. Ringe, Orchard Lake, Mich., assignor to Ford Motor Company, Dearborn, Mich., a corporation of Delaware
Filed Apr. 29, 1968, Ser. No. 724,941
Int. Cl. F16h 37/00, 57/00
U.S. Cl. 74—740
6 Claims

ABSTRACT OF THE DISCLOSURE

A multiple-ratio, geared, power transmission for use in an automotive vehicle driveline including a planetary gear overdrive unit that is adapted to be secured to the main housing for transmission, the main housing in turn being connected to the vehicle engine, and an overdrive clutch-and-brake arrangement having a pressure-shiftable element that defines in part a pair of opposed pressure chambers, the clutch-and-brake being independent of the gear elements of the planetary gear unit whereby the gear tooth forces are isolated with respect to the clutch-and-brake.

GENERAL DESCRIPTION OF THE INVENTION

My invention comprises an auxiliary, planetary gear system which is used in combination with a main, multiple-ratio power transmission mechanism in an automotive vehicle driveline. The auxiliary gearing, together with the main gearing, provide a direct drive ratio, at least one underdrive ratio and an overdrive ratio. The auxiliary unit can be secured in a semipermanent fashion to the housing of the main transmission to form a composite assembly. The auxiliary gearing includes a simple planetary overdrive gear unit, the relative motion of the gear elements of which is controlled by an overdrive clutch-and-brake.

Torque is delivered to the overdrive gear unit through a parent transmission output shaft and the ring gear of the overdrive gear unit is connected to the transmission tail shaft. The sun gear of the overdrive gear unit functions as a reaction member when the overdrive brake is applied. When the overdrive brake is released and the overdrive clutch is applied, the elements of the gear unit are locked together for rotation in unison.

Spring means is provided for normally engaging the clutch and normally releasing the brake. The clutch engaging force, however, can be complemented by a fluid pressure operated clutch servo. This clutch servo has elements that are common to a fluid operated brake servo. The common elements comprise a shiftable drum which is internally splined to carry externally splined clutch discs and externally splined brake discs.

The gear elements of the overdrive gear unit are held axially fast by thrust washers which are effective to transfer the thrust forces developed by the gear tooth loads on the gear unit to the transmission housing. The clutch and the brake each include further a reaction disc which is held axially fast by the same thrust washers used for the gearing.

A drum cooperates with the reaction discs to define a pair of opposed working chambers. As the working chambers are selectively pressurized, the overdrive clutch and brake become selectively applied and released and the drum is shifted axially from one operating position to another.

A preloaded spring situated between the reaction disc for the clutch and the shiftable drum normally tends to release the brake and apply a predetermind clutch engaging force to the clutch regardless of the presence or absence of pressure from the working chambers.

BRIEF DESCRIPTION OF THE FIGURES OF THE DRAWINGS

FIGURE 1 shows in schematic form a planetary gearing arrangement corresponding to the parent transmission with which the auxiliary gear unit of my invention may be used.

FIGURE 2 shows in longitudinal cross-sectional form a preferred embodiment of the auxiliary gear unit of my invention.

PARTICULAR DESCRIPTION OF THE INVENTION

In FIGURE 1 numeral 10 designates a power input shaft, which is driven by a hydrokinetic torque converter turbine. The impeller of the torque converter can be connected to the crankshaft of an internal combustion engine in an automotive vehicle driveline in known fashion.

The gear system for the FIGURE 1 construction comprises a first simple planetary gear unit 12, a second simple planetary gear unit 14, a forward drive clutch 16, a direct and reverse clutch 18, an intermediate speed ratio brake band 20 and a manual low-and-reverse brake band 22.

A sun gear 24 is common to both of the planetary gear units 12 and 14. Gear unit 12 includes, in addition to the sun gear 24, a ring gear 26, planet pinions 28 and a planetary carrier 30 which journals rotatably the pinions 28. Carrier 30 is connected drivably to the transmission output shaft 32.

Gear unit 14 includes, in addition to sun gear 24, a ring gear 34, planet pinions 36 and a planetary carrier 38. The carrier defines or is connected directly to a brake drum which is surrounded by brake band 22. The brake band 22 can be applied and released by reverse-and-low servo 40, thereby anchoring selectively the carrier 38. The drum of which the carrier 38 forms a part is adapted to be anchored by means of overrunning brake 42, the stationary race 44 of which is connected to the transmission housing 46.

Sun gear 24 is connected by means of a drive shell 48 to a clutch-and-brake drum 50. The intermediate brake band 20 surrounds the drum 50, and it can be applied and released selectively by a fluid operated servo 52 thereby anchoring and releasing the sun gear 24.

Multiple disc clutch 18 includes an element 54 which is common to the external clutch element 56 of the clutch 16. The companion clutch element 58 for the clutch 16 is connected to the ring gear 26. The common clutch elements 54 and 56 are connected to power input shaft 10. The clutch-and-brake drum 50 is journalled rotatably on a stationary sleeve shaft connected to the housing 46.

The gearing shown in FIGURE 1 is capable of providing three forward-driving speed-ratios and a single reverse speed-ratio. The forward clutch 16 is applied during operation in each of the three forward-driving ratios.

To establish the lowest speed ratio, it merely is necessary to apply the clutch 16. Clutch 18 and both brake bands are released. Turbine torque in shaft 10 then is distributed through the clutch 16 to the ring gear 26. A split torque delivery path is established through the gearing as the carrier 30 drives shaft 32 in a forward driving direction. The sun gear 24 is caused to rotate in a reverse direction thereby causing forward driving motion of the ring gear 34, which motion is transmitted to the output shaft 32. The reaction element for the system is carrier 38, which is anchored by the overrunning brake shown in part at 42.

If desired, brake band 22 can be applied if continuous operation in the low speed-ratio is desired. This will provide coast braking in the lowest speed-ratio since it is capable of accommodating torque reaction in a direction opposite to the direction of the braking action of the overrunning brake 42.

A speed-ratio change to the intermediate speed-ratio is achieved by engaging the intermediate brake band 20. This is done by pressurizing the working chamber behind the piston of servo 52. Turbine torque delivered to the ring gear 26 through the applied forward clutch 16 then drives carrier 30 in a forward driving direction as the sun gear 24 acts as a reaction member. Sun gear 24 is braked by the brake band 20. The gear unit 14 has no function during intermediate speed-ratio operation.

Direct drive is achieved by engaging simultaneously both forward clutch 16 and the direct-and-reverse clutch 18. This locks together the elements of the gearing for rotation in unison. Both the brake bands are released.

Reverse drive is obtained by engaging the direct-and-reverse clutch 18 and by releasing the clutch 16. At the same time reverse brake band 22 is applied thereby allowing the carrier 38 to act as a reaction point. The sun gear 24 now acts as a power input element, as it is driven by the shaft 10 through the clutch 18.

An additional drive ratio, which is an overdrive ratio, is obtained by the auxiliary gear unit shown in FIGURE 2. This includes a transmission end plate 60, which is bolted to the right-hand end of the parent transmission housing 46. Plate 60 is formed with an annular shoulder 62, which registers with the left-hand margin of overdrive transmission housing 64. The housing 64 can be bolted to the plate 60 thereby providing a composite transmission housing.

The right-hand end of the housing 64 defines a power output shaft extension sleeve 66 within which is journalled power output shaft 68.

The shaft 68 is journalled in extension 66 by bearing 70. It also is journalled by means of a bearing in its right-hand end.

The end plate 60 is formed with a bearing support sleeve 72 on which is journalled a compound governor valve assembly 74. This includes a primary governor 76 and a secondary governor 78 in a common valve body, the latter being supported by drive plate 80 which is keyed or otherwise secured by the shaft 32.

A stationary manifold sleeve 82 is connected to the housing 64. Journalled rotatably in the sleeve 82 is the hub 84 of a rotary brake disc 86. This forms a part of an overdrive brake identified generally by reference character 88. A companion overdrive clutch is shown at 90.

The hub is separated by means of a thrust washer 86 from a reaction ring 88 which in turn engages a shoulder on shaft 32. The right-hand end of the hub 84 is keyed at 90 to sun gear 94 for an overdrive planetary gear unit 96.

Surrounding the brake disc 86 is a clutch-and-brake drum 98. It is internally splined at 100 to receive one or more externally splined brake discs 102. These cooperate with internally splined discs 104 carried by splined brake ring 106, the left-hand margin of which is keyed at 108 to the separator plate 60.

The drum 98 is internally splined also at 110 to form a driving connection with externally splined clutch discs 112. These register with internally splined clutch discs 114 carried by ring gear 116, which forms a part of the gear unit 96.

Slidably received within the drum 98 is a clutch piston 118. Drum 98 cooperates with the hub 84 to define an annular cylinder within which the annular piston 118 is received.

The drum 98 includes an annular wall 120 which extends inwardly and which is slidably received over the hub 84. It cooperates with the clutch piston 118 and the brake disc 86 to define a pair of opposed working chambers identified respectively by reference characters 122 and 124. Chamber 122 is in fluid communication with annular groove 126 formed in the hub 84; and chamber 124 is in fluid communication with an annular groove 128, also formed in the hub 84. Internal fluid passages provide this communication as indicated at 130 and 132, respectively.

Clutch piston 118 is urged normally away from the wall 120 by Belleville spring 134. The inner margin of the spring engages the wall 120 and its outer margin engages the clutch piston 118.

Gear unit 96 includes, in addition to the sun gear 94 and the ring gear 116, a carrier 136 on which is journalled rotatably planet pinions 138. Pinions 138 engage sun gear 94 and the ring gear 116. Carrier 136 is splined at 140 to the output shaft 32 for the parent transmission. Ring gear 116 is connected drivably to drive flange 143, which is connected directly to the power output shaft 68.

Thrust on the sun gear 94 is transmitted through radial thrust bearing 142 to the carrier 136. Thrust washers 144 and 146 transfer the combined gearing thrust forces on the planetary gear unit to the housing 64.

Drum 98 can be shifted in one axial direction or the other depending upon which pressure chamber 122 or 124 is pressurized. Selective pressure distribution in these chambers can be made through the feed passages 130 and 132. Normally Belleville spring 134 will tend to keep the "lockup" clutch 90 applied so that the overdrive gear unit of FIGURE 2 will normally operate with a one to one direct-drive ratio. At the same time the spring force reaction on the drum 98 tends to release the brake 88.

When overdrive operation is desired following an upshift of the main transmission assembly to the direct drive ratio, pressure chamber 124 can be pressurized. This causes the drum 98 and the wall 120 to shift in a right-hand direction which releases the clutch 90 and applies the brake 88. The sun gear 94 and the brake member 86 thus become anchored to the transmission housing through the brake member 106. The output torque in shaft 32 then drives the carrier 136, which results in an overspeeding of the ring gear 116 and the power output shaft 68.

All of the thrust forces acting on the gearing elements of gear unit 96 are transmitted directly to the casing. No gear thrust forces act on the shiftable clutch-and-brake drum 98. Thus the application and release of the overdrive clutch-and-brake members is not affected by any control variables except the clutch-and-brake apply pressure made available to the chambers 122 and 124. Undesirable dragging of the friction elements of the overdrive clutch-and-brake thus does not occur.

When the vehicle is parked with the engine inactive, the Belleville spring disc 134 applies a sufficient force to lock the sun gear and the ring gear together. Thus it is possible to lock the transmission output shaft 68 with the parking brake of the main transmission. The parking brake normally anchors the shaft 32 to the housing for the main transmission. Because of the normal clutching action of the clutch 90, the same parking brake is used to lock the shaft 68 to the transmission housing.

During operation, the operator generally will select the drive range in which he chooses to operate. This is either the direct drive-range or the overdrive drive-range. The full range of underdrive ratios of the main transmission still is available regardless of the range that is chosen for the FIGURE 2 overdrive construction. During operation in the direct drive-range, pressure is applied to chamber 122 to complement the action of the spring thereby providing sufficient direct drive clutch capacity to accommodate the driving torque developed by the torque converter and the parent transmission in each underdrive ratio.

Having thus described a preferred form of my invention, what I claim and desire to secure by U.S. Letters Patent is:

1. An overdrive gear unit for use with a multiple-ratio power transmission mechanism having a relatively stationary housing and multiple-ratio gear elements in said housing which are adapted to establish plural torque delivery paths between a driving member and a main transmission output shaft, an auxiliary housing connected to said main transmission housing, said main transmission output shaft extending within said auxiliary housing, an overdrive planetary gear unit in said auxiliary housing comprising a ring gear, a sun gear, planet pinions journalled on said sun gear in meshing engagement with said sun and ring gears, and a planet carrier journaling said planet pinions, a driving connection between said carrier and said main transmission output shaft, a final torque output shaft coaxially mounted with respect to said main transmission output shaft, overdrive clutch-and-brake means comprising an axially shiftable drum, an annular wall extending radially inwardly from said drum, a hub connected drivably to said sun gear and journalled rotatably about the axis of said main transmission output shaft, a brake disc connected to said hub, said annular wall and said brake disc cooperating to define a brake pressure chamber, a clutch disc surrounding said hub, said clutch disc and said radial wall cooperating to define a clutch pressure chamber, a first friction brake element carried by said drum adjacent said brake disc, a first friction clutch element carried by said drum adjacent to said clutch disc, another brake element carried by a stationary portion of said mechanism adjacent said first brake element, a second clutch element connected to said ring gear and situated adjacent said first clutch element, and passage means for selectively distributing control pressure to each of said pressure chambers thereby controlling the application and release of said clutch-and-brake means.

2. An overdrive gear unit for use with a multiple-ratio power transmission mechanism having a relatively stationary housing and multiple-ratio gear elements in said housing which are adapted to establish plural torque delivery paths between a driving member and a main transmission output shaft, an auxiliary housing connected to said main transmission housing, said main transmission output shaft extending within said auxiliary housing, an overdrive planetary gear unit in said auxiliary housing comprising a ring gear, a sun gear, planet pinions journalled on said sun gear in meshing engagement with said sun and ring gears, and a planet carrier journaling said planet pinions, a driving connection between said carrier and said main transmission output shaft, a final torque output shaft coaxially mounted with respect to said main transmission output shaft, overdrive clutch-and-brake means comprising an axially shiftable drum, an annular wall extending radially inwardly from said drum, a hub connected drivably to said sun gear and journalled rotatably about the axis of said main transmission output shaft, a brake disc connected to said hub, said annular wall and said brake disc cooperating to define a brake pressure chamber, a clutch disc surrounding said hub, said clutch disc and said radial wall cooperating to define a clutch pressure chamber, a first friction brake element carried by said drum adjacent said brake disc, first friction clutch element carried by said drum adjacent to said clutch disc, another brake element carried by a stationary portion of said mechanism adjacent said first brake element, a second clutch element connected to said ring gear and situated adjacent said first clutch element, passage means for selectively distributing control pressure to each of said pressure chambers thereby controlling the application and release of said clutch-and-brake means, and spring means situated between said clutch disc and said clutch-and-brake drum whereby the latter normally is urged to a clutch applying position, which position corresponds to its brake release position.

3. The combination as set forth in claim 2 wherein said spring means comprises in annular Belleville disc spring member in said clutch pressure chamber, one margin of said disc spring engaging said clutch disc and the other margin thereof engaging said annular wall carried by said clutch-and-brake drum.

4. The combination as set forth in claim 1 including thrust washers situated on each axial side of said hub for distributing gear thrust forces directly to said housing whereby said drum is isolated from the gear thrust forces to permit controlled shifting movement thereof under the influence of control pressure distributed selectively to said clutch pressure chamber in said brake pressure chamber.

5. The combination as set forth in claim 2 including thrust washers situated on each axial side of said hub for distributing gear thrust forces directly to said housing whereby said drum is isolated from the gear thrust forces to permit controlled shifting movement thereof under the influence of control pressure distributed selectively to said clutch pressure chamber in said brake pressure chamber.

6. The combination as set forth in claim 3 including thrust washers situated on each axial side of said hub for distributing gear thrust forces directly to said housing whereby said drum is isolated from the gear thrust forces to permit controlled shifting movement whereof under the influence of control pressure distributed selectively to said clutch pressure chamber in said brake pressure chamber.

References Cited

UNITED STATES PATENTS

| | | | |
|---|---|---|---|
| 2,605,653 | 8/1952 | Banker | 74—781 |
| 2,806,387 | 9/1957 | Forster et al. | 74—781 X |
| 2,911,848 | 11/1959 | Carnagua | 74—740 X |
| 3,126,765 | 3/1964 | Conkle | 74—740 X |
| 3,182,528 | 5/1965 | Lamburn | 74—781 X |
| 3,396,610 | 8/1968 | Rich et al. | 74—740 |

FOREIGN PATENTS

| | | |
|---|---|---|
| 1,021,507 | 2/1953 | France. |
| 1,160,308 | 12/1963 | Germany. |

ARTHUR T. McKEON, Primary Examiner

U.S. Cl. X.R.

74—781; 192—18, 87.17